United States Patent [19]
Lock et al.

[11] Patent Number: 5,765,432
[45] Date of Patent: Jun. 16, 1998

[54] FLOW SENSOR

[75] Inventors: Andreas Lock, Reutlingen; Uwe Konzelmann, Asberg, both of Germany

[73] Assignee: Robert Bosch GmbH, Stuttgart, Germany

[21] Appl. No.: 737,530

[22] PCT Filed: Mar. 9, 1996

[86] PCT No.: PCT/DE96/00486

§ 371 Date: Nov. 8, 1996

§ 102(e) Date: Nov. 8, 1996

[87] PCT Pub. No.: WO96/28712

PCT Pub. Date: Sep. 19, 1996

[30] Foreign Application Priority Data

Mar. 16, 1995 [DE] Germany ............ 195 09 555.3

[51] Int. Cl.[6] .................................................. G01F 1/68
[52] U.S. Cl. ............................................... 73/204.11
[58] Field of Search ..................... 73/204.11, 204.26, 73/204.14, 204.15, 204.16, 204.19, 204.25

[56] References Cited

U.S. PATENT DOCUMENTS

| | | | |
|---|---|---|---|
| 4,581,928 | 4/1986 | Johnson | 73/204 |
| 4,651,564 | 3/1987 | Johnson et al. | 73/204.26 |
| 4,696,188 | 9/1987 | Higashi | 73/204.26 |
| 4,829,814 | 5/1989 | Suzuki et al. | 73/204.26 |
| 4,888,988 | 12/1989 | Lee et al. | 73/204.26 |
| 5,291,781 | 3/1994 | Nagata et al. | 73/204.26 |

*Primary Examiner*—George M. Dombroske
*Assistant Examiner*—Jewet Artis
*Attorney, Agent, or Firm*—Kenyon & Kenyon

[57] ABSTRACT

A flow sensor has a diaphragm and a resistive film positioned on the diaphragm. A heater is formed from the resistive film and temperature sensors are arranged on both sides of the heater. On both sides of the heater are additional temperature sensors, which are interconnected by an interconnect resistor and formed from the resistive film.

10 Claims, 2 Drawing Sheets

FLOW SENSOR

FIELD OF THE INVENTION

The present invention relates to a flow sensor.

BACKGROUND INFORMATION

U.S. Pat. No. 4,581,928 describes a flow sensor comprising a diaphragm, in which case, a heater and, on both sides of the heater, a temperature sensor are arranged on the diaphragm. The heater and the temperature sensors are patterned out of a resistive film. For evaluation purposes, the temperature sensors are arranged with other resistors in a measuring bridge circuit.

SUMMARY OF THE INVENTION

One of the advantages of the flow sensor according to the present invention is that an improvement in the signal from the sensor element is achieved. Only a slightly greater outlay is required for the present invention. Furthermore, the sensor element has a symmetrical form, which results in well synchronized signals from the individual temperature sensors. The outlay is especially low, since all elements are patterned out of one and the same resistive film. Therefore, manufacturing tolerances have only a slight influence on the measuring element.

The temperature sensors and the additional temperature sensors can be arranged inside one another or also side by side. Without additional expenditure, leads for the heater, the temperature sensors, and the other temperature sensors can be formed out of the resistive layer. The sensor signal is easily and precisely identifiable by configuring the temperature sensors and the additional temperature sensors in a measuring bridge. Expediently connected parallel to the interconnect resistor are adjustable resistors for adjusting (or balancing) the bridge. The adjustable resistors can be highly resistive in design to eliminate the temperature coefficient of the interconnect resistor.

DETAILED DESCRIPTION OF THE INVENTION

Figure 1:
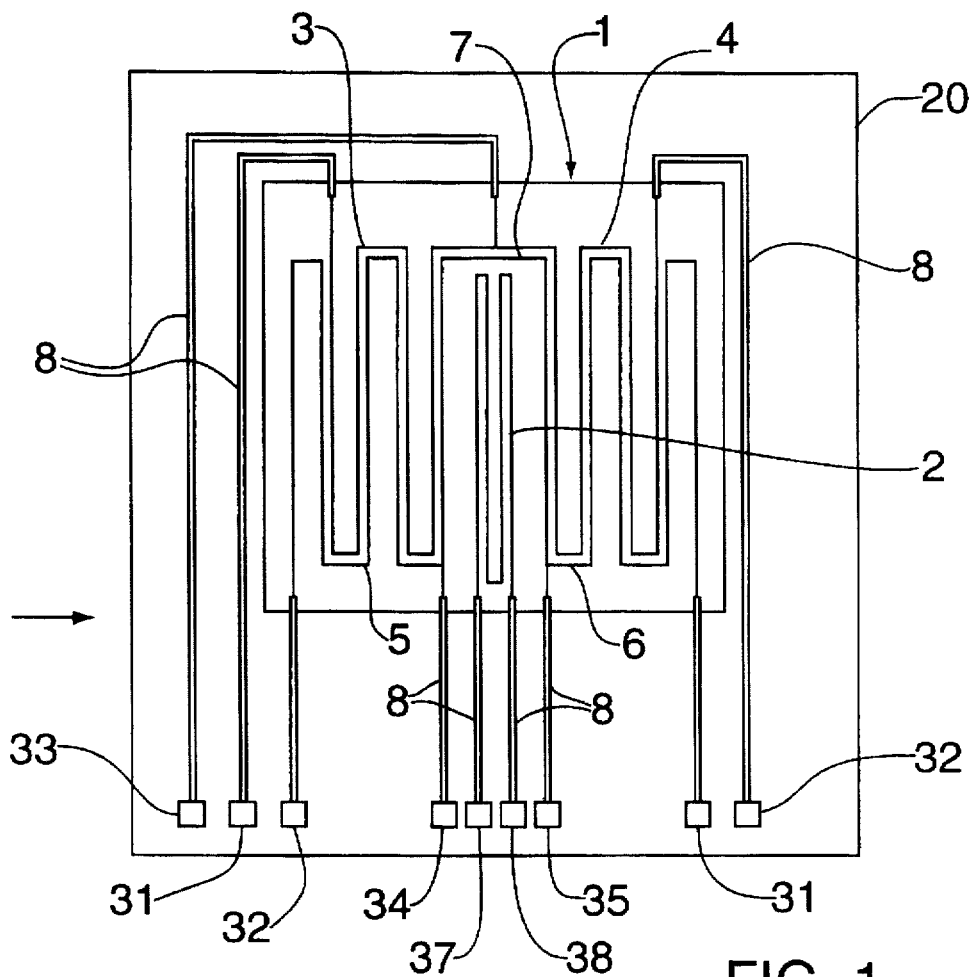
FIG. 1 shows a plan view of a first embodiment of the flow sensor according to the present invention.

FIG. 1 illustrates a plan view of a measuring element according to the present invention. The measuring element consists of a substrate 20, which supports a diaphragm 1. Diaphragm 1 has an especially low thermal inertia and an especially low thermal conductivity. Provided on diaphragm 1 is heater 2, temperature sensors 3 and 4, additional temperature sensors 5, 6, and an interconnect resistor 7. The diaphragm is heated by heater 2 to a predetermined temperature. When, as indicated by the arrow, fluid flows along on the top side of the diaphragm, then the diaphragm is cooled by this fluid flow. Sensors 3 and 5 situated upstream in the direction of flow are more heavily cooled than downstream sensors 4 and 6. The flow intensity can be inferred from the verification of this temperature difference.

Heater 2 is designed as a resistor element, i.e., it is warmed by an electric current flowing through it. Temperature measuring sensors 3, 4, 5 and 6 are designed as thermometer resistors, i.e., the temperature of the individual measuring elements can be determined by measuring the voltage dropping across each resistor.

Printed conductors 8 and bonding pads 31–38 are provided for contacting heater 2, temperature sensors 3, 4, and additional temperature sensors 5, 6. Wires, which establish an electrical contact with an evaluation circuit, are secured to bonding pads 31–38. The electrical signals are routed on substrate 20 through printed conductors 8.

As also described in U.S. Pat. No. 4,581,928, substrate 20 has been conceived of as a silicon substrate. To form diaphragm 1, a thin dielectric layer is applied to the top side of substrate 20, and substrate 20 is then removed underneath diaphragm 1. As also described in U.S. Pat. No. 4,581,928, this can take place through openings (or slots) in the diaphragm. Alternatively, it is also possible to etch out an opening, starting from the rear side of substrate 20 up to the diaphragm layer, and to produce diaphragm 1 in this manner. Besides silicon, other materials are also suitable for substrate 20.

Heater 2, resistors 3, 4, 5, 6 and 7, printed conductors 8, and bonding pads 31–38 are fabricated by patterning a layer that is initially applied over the entire surface. Printed conductors 8 have a substantially larger cross-section, so that their resistance is comparatively lower than that of resistors 2 through 7. It is especially significant for the functioning of the sensor that the upstream resistor elements 3, 5 and the downstream resistor elements 4 and 6 are each disposed symmetrically to heater 2. Because of their appreciable residual resistances, printed conductors 8 should also be routed symmetrically to resistors 3, 4, 5 and 6. When all elements are patterned out of one single layer, it is not possible to have a cross-over configuration of printed conductors. Therefore, an interconnect resistor 7, which establishes an electrical connection between these two resistor elements, is arranged between the two additional resistor elements 5 and 6. This makes it possible for the printed conductors 8 to be routed symmetrically up to resistors 5 and 6.

Figure 4:
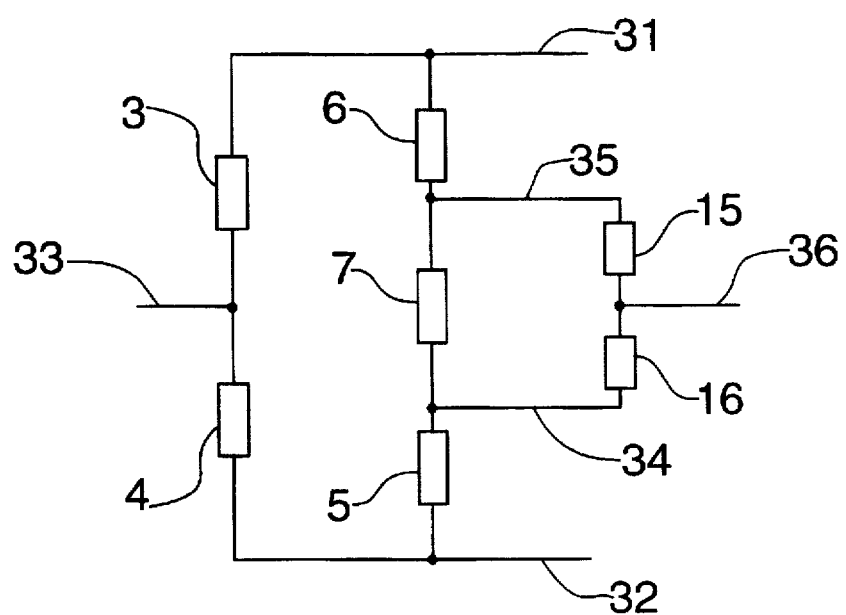
FIG. 4 shows an equivalent circuit diagram of the measuring bridge.

An equivalent circuit diagram of the evaluation circuit of the measuring element is shown in FIG. 4. Temperature sensors 3, 4 form a first measuring-bridge branch with a center tap 33. The additional temperature-measuring sensors 6, 7 and 5 form a second measuring-bridge branch with two taps 34 and 35. Connection 31 is linked to a supply voltage, and connection 32 to ground. Taps 31–35 correspond to bonding pads, which are to be seen in the plan view of the measuring element shown in FIG. 1.

Also provided in the evaluation circuit are adjustable resistors 15 and 16, which are connected in parallel to interconnect resistor 7. Provided between adjustable resistors 15 and 16 is a corrected bridge tap 36. The zero point of the measuring bridge can be adjusted by balancing the resistance values of resistors 15 and 16.

As shown in FIG. 1, all resistors arranged in the measuring bridge are situated on the diaphragm, so that the resistance of each bridge resistor changes with the fluid flow. The thus formed bridge circuit thus exhibits an especially strong signal. Because the printed conductors 8 have an appreciable residual resistance, an asymmetrical link-up of the printed conductors 8 to the individual resistors would produce a characteristic of the bridge arrangement that is distorted accordingly. For that reason, all the printed conductors must be routed symmetrically to the resistors on the diaphragm. In the case of the bridge branch, which is formed by resistors 3 and 4, one single printed conductor is provided for tap 33. A tap of this type would also be optimal for the bridge branch which is formed by resistors 5 and 6. When all resistors 2 through 7 and all printed conductors 8 are patterned out of one single layer, however, a tap of this type is not possible. Interconnect resistor 7 is, therefore, provided to render possible a symmetrical link-up, so that two taps 34 and 35 are able to be linked up symmetrically. The two signals are then united at taps 34 and 35 via adjustable resistors 15 and 16 to form a corrected bridge tap 36. By properly adjusting resistance values 15 and 16, a certain residual imbalance of the bridge can thereby be compensated. It can be problematic in this case when interconnect resistor 7 likewise changes its resistance value on the basis of the temperature on the diaphragm. When the total resistance of resistors 15 and 16 is relatively high compared to the resistance value of interconnect resistor 7, then this temperature sensitivity of interconnect resistor 7 only has a slight effect on the output signal at tap 36.

In FIG. 1, temperature sensors 3, 4 and the additional temperature sensors 5, 6 are designed as meander-shaped resistor runs, which are nested into one another. Thus, temperature sensor 3 is situated on the same diaphragm surface as the other temperature sensor 5. Temperature sensor 4 is configured on the same diaphragm surface as the other temperature sensor 6. With this configuration, temperature sensors 3 and 4 measure the temperature on the same diaphragm regions as the two temperature sensors 5 and 6.

Figure 2:
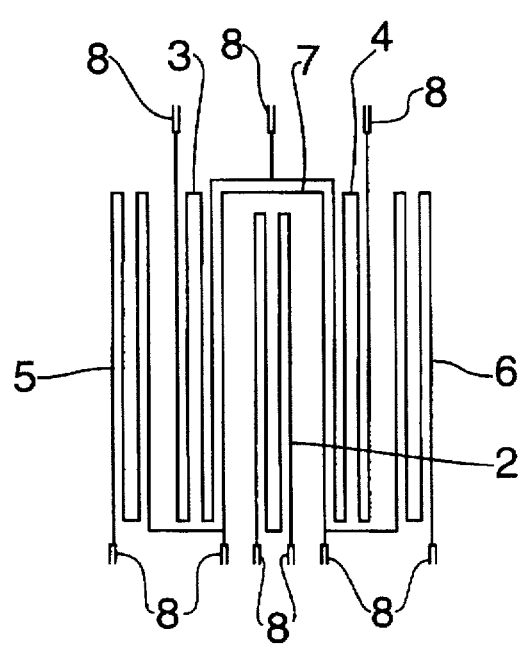
FIG. 2 shows a second embodiment of the flow sensor.
Figure 3:
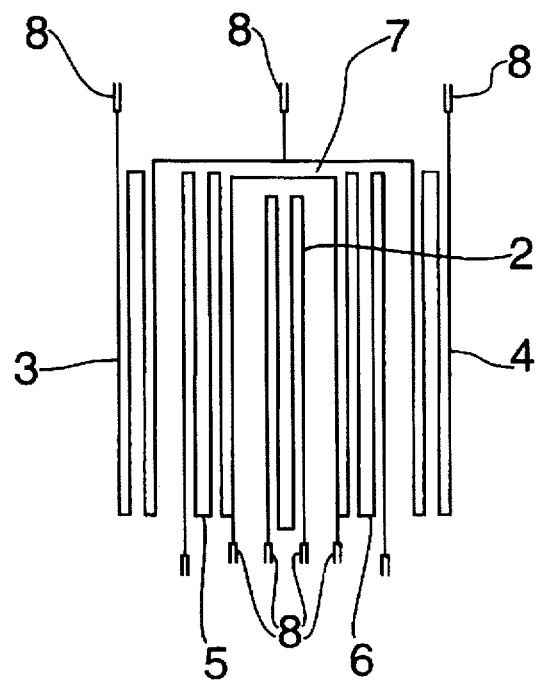
FIG. 3 shows a third embodiment of the flow sensor.

Another embodiment according to the present invention with temperature sensors 3, 4 and with additional temperature sensors 5, 6 is shown in FIGS. 2 and 3. For the sake of simplification, the diaphragm, the printed conductors, and substrate 20 are not shown. In FIG. 1, temperature sensors 3, 4, and the other temperature sensors 5, 6 cover the same area of the diaphragm, so that they cover a relatively large surface because they nest into one another. An arrangement is shown in FIG. 2 where the individual resistor elements for temperature sensors 3, 4, 5 and 6 are not nested into one another and, therefore, can have a much compacter design. Due to a temperature gradient in the diaphragm, emanating from the centrally arranged heater 2, each temperature sensor is exposed to a relatively small temperature gradient because of the more compact arrangement of resistor elements 3, 4, 5 and 6, and the associated covering of a small diaphragm area. An arrangement is shown in FIG. 2, where temperature sensors 3, 4 are arranged on the inside, i.e., near heater 2, and the other temperature sensors 5, 6 are arranged further outside. An arrangement is shown in FIG. 3, where the other temperature sensors 5, 6 are arranged on the inside, i.e., near heater 2, and temperature sensors 3, 4 on the outside, i.e., further removed from the heater 2.

We claim:

1. A flow sensor, comprising:

a measuring element having a diaphragm and a resistive film, the resistive film positioned on the diaphragm;

at least one heater formed from the resistive film and having a first side and a second side;

first temperature sensors provided on the first and second sides of the at least one heater;

second temperature sensors provided on the first and second sides of the at least one heater; and an interconnect resistor interconnecting the second temperature sensors, wherein the second temperature sensors and the interconnect resistor are positioned on the diaphragm and are formed from the resistive film.

2. The flow sensor according to claim 1, wherein the first and second temperature sensors have meander-shaped resistor run designs, the first temperature sensors being nested into the second temperature sensors.

3. The flow sensor according to claim 1, wherein the first and second temperature sensors have meander-shaped resistor run designs, the second temperature sensors being nested into the first temperature sensors.

4. The flow sensor according to claim 1, wherein the first temperature sensors are positioned closer to the at least one heater than the second temperature sensors.

5. The flow sensor according to claim 1, wherein the second temperature sensors are positioned closer to the at least one heater than the first temperature sensors.

6. The flow sensor according to claim 1, further comprising:

leads for contacting at least one of the at least one heater, the first temperature sensors, the second temperature sensors and the interconnect resistor, wherein the leads are formed from the resistive layer.

7. The flow sensor according to claim 1, further comprising:

a measuring bridge including a first branch, a second branch and a center tap, the first branch formed using the first temperature sensors, the center tap positioned between the first temperature sensors, the second branch formed using the interconnect resistor and the second temperature sensors, wherein the interconnect resistor is positioned between the second temperature sensors, and wherein the second branch includes two taps, each of the two taps being arranged between the interconnect resistor and each of the second temperature sensors.

8. The flow sensor according to claim 6, further comprising:

adjustable resistors coupled in series between the two taps of the second bridge branch; and a compensated tap provided between the adjustable resistors.

9. The flow sensor according to claim 8, wherein the adjustable resistors have a higher resistance than the interconnect resistor.

10. The flow sensor according to claim 1, wherein the first temperature sensors are formed from the resistive film.

* * * * *